United States Patent [19]

Skarstrom et al.

[11] 3,735,558
[45] May 29, 1973

[54] PROCESS FOR SEPARATING FLUIDS AND APPARATUS

[75] Inventors: Charles W. Skarstrom, Montvale; Jack Kertzman, Oceanport, both of N.J.

[73] Assignee: Perma Pure Process, Inc., Oceanport, N.J.

[22] Filed: June 29, 1971

[21] Appl. No.: 157,860

[52] U.S. Cl. ..................................... 55/16, 55/158
[51] Int. Cl. ............................................ B01d 53/22
[58] Field of Search .................... 55/16, 33, 68, 158, 55/29

[56] References Cited

UNITED STATES PATENTS

| | | | |
|---|---|---|---|
| 3,144,313 | 8/1964 | Pfeffexe | 55/16 |
| 3,228,877 | 1/1966 | Mahon | 55/158 |
| 3,367,850 | 2/1968 | Johnson | 55/158 |
| 3,292,346 | 12/1966 | Adams | 55/33 |
| 3,303,105 | 2/1967 | Koxikoff et al. | 55/16 |
| 3,307,330 | 3/1967 | Niedzielski et al. | 55/16 |

Primary Examiner—Charles N. Hart
Attorney—Lawrence I. Lerner et al. and John Paul Corcoran

[57] ABSTRACT

A continuous process is provided for separating key components from mixed fluids, for example, separating water vapor from air, wherein a mixed fluid feed including a key component, at a preselected initial relatively high pressure is passed through a single or a series of hollow tube(s), the walls of which are selectively permeable to the key components of the mixed feed. At the produce end of the tubes, a portion of the product and/or an external purge fluid is expanded or flashed to a lower pressure than the mixed feed and caused to flow as reflux counter-current along the outside of the tubes toward the feed end. In this manner, a pressure gradient is created across the walls of the permeable tubes to induce permeation. The counter-current reflux flow induces a longitudinal concentration gradient along the walls of the permeable tubes which enhances permeation of key components through the walls of the tubes thereby separating them from the mixed fluid feed.

Apparatus is also provided for carrying out the above-described fluid separation process.

21 Claims, 15 Drawing Figures

INVENTOR.
JACK KERTZMAN
CHARLES W. SKARSTRON
BY
LERNER, DAVID & LITTENBERG
ATTORNEYS

PROCESS FOR SEPARATING FLUIDS AND APPARATUS

FIELD OF THE INVENTION

The present invention relates to a continuous process for separating selective or key components from mixed fluid feeds, such as separating moisture and/or carbon dioxide from air, and apparatus useful in carrying out such separation.

BACKGROUND OF THE INVENTION

Industrial processes and applications requiring moisture-free air are legion in number. Some of the more well-known applications requiring moisture-free air include the operation of pneumatic controls, as in air conditioning, wherein water may freeze in cold weather and destroy the controls; in laboratory instruments, such as infrared spectrophotometers where moisture in air can decrease the sensitivity of the instrument and null out a portion of the spectrum or in gas chromatography equipment wherein the presence of water vapor in carrier gases on instruments utilizing temperature programming may cause hydrolysis of esters or oxidation of the column; in calibrating of electrolytic or other type moisture analyzers such as dew point instruments, resistance elements or gravimetric moisture balances; in optical instruments such as mass spectrograph, nuclear magnetic resonance, X-ray diffraction or ultraviolet spectrophotometers wherein moisture condensation on optical components can lead to breakdown; in paint spraying where if droplets of water are discharged with air they will spoil the paint finish. Furthermore, dry and ultrapure gases such as extremely dry air, are required in the production of vacuum tubes, condensers, semiconductors, hermetic sealed components, electronic systems utilizing microwave frequencies, radar equipment, other electronic communications systems such as radio frequency cables, antennas, wave guides and duplexers as well as in the manufacture of chemicals, polymers, plastics and petroleum, in the preparation of dehydrated foods and preservation of foodstuffs.; in the use of high speed air drills in dental work, and in air-bearings in computer tape drives.

The problem of moisture condensation is particularly acute in pressurized conduits and communication cable, such as gas lines and telephone lines. It is essential that moisture-free gas be employed in pressurizing conduits or cable to avoid cross-talk in telephone lines and to avoid moisture condensation, leading to acid formation, ice formation and subsequent breakdown. However, notwithstanding the efforts made in behalf of controlling such breakdown of gas and telephone transmission lines, it is still an ever present problem with no apparent efficient or economical solution.

The use of wave guides in telephone communication systems is now a reality. It is essential that the moisture and oxygen content of air in the wave guides be carefully controlled in order to reduce maintenance problems and the possibility of breakdown.

Many methods have been suggested and used to eliminate or control moisture in air and other gases depending upon the use intended for the dry gases. One method in current use is compression drying wherein wet gas is compressed and then cooled to ambient temperature and excess water is condensed in a storage sump. The major drawback with this type of drying operation is that the compressed gas is saturated at the temperature of the coolest part of the system thereby causing frequent accumulation of liquid water in the distribution system. It is thus necessary to partially expand the compressed gases close to the source of compression to unsaturate the compressed gas with consequent loss of pneumatic efficiency. Furthermore, extremely high pressures are required in compression drying operation with subsequent expansion to attain moderately low dew points at low pressure.

Refrigeration drying has been employed where accumulation of liquid water in air distribution systems is a problem. This system employs a cold sump below ambient temperature, from which compressed gas emerges with a dew point no lower than the temperature of the cold sump. Subsequent expansion further lowers the dew point. The problem with this type of system is that the lowest refrigeration temperature is 35°–40° F. Below this temperature, ice forms on the chilling coils, reducing their efficiency and requiring periodic defrosting. This added complication of periodic defrosting turns this continuous drying technique into a batch process.

Attempts have been made to remove moisture from compressed gases by employing various chemical substances such as calcium sulfate, concentrated sulphuric acid, glycerine and phosphorus pentoxide. Many of these materials must be drained off, regenerated or replaced as they become saturated. This involves interruption of the compressed air service, expensive maintenance and possible pollution problems. Regenerable amine, glycerine and halogen salt liquid drying systems are large and complex, and subject to corrosion, and may pollute the gas being dried.

Regenerable solid desiccants such as silica gel, activated alumina and molecular sieves may be used. They adsorb water from compressed gases, and are used to achieve the lowest dew points in the present commercial state of the art (minus 100° F). They usually are regenerated by heating to remove the accumulated moisture before it breaks through. Another commercial process, called heatless drying, uses the same solid desiccants without the heating cycle. Instead, a back purge with some of the dried product at low pressure periodically regenerates the desiccant. Even lower dew points can be achieved with heatless drying, such as minus 320° F. However, even the use of regenerable solid desiccants has significant drawbacks. Heat regeneration of solid commercial desiccants requires multiple beds for continuous drying. The desiccant life is shortened by attrition and by the formation of coke from oxidated oil, usually present in compressed gases. A complex mechanical and electrical system is needed to cycle the beds through dehydration and cook-out regeneration steps. The heatless process eliminates the heating step, but still requires cycling valves and a program timer. Furthermore, solid desiccant technology for drying compressed gases is basically a batch process.

It has now been found that key or selective components can be separated from multiple component fluid mixtures such as gas mixtures (for example water vapor from air), liquid mixtures and mixtures of liquids and gases, without the need for employing complicated and expensive techniques and/or equipment, in an efficient and economical manner by employing the unique system of the present invention which utilizes a permeation-distillation or reflux technique wherein a combination of gradients or permeation driving forces, namely a pressure gradient and a concentration gradient, are established across the walls of a semipermeable membrane selectively permeable to the key components desired to be separated from the mixed fluid feed, which induce and surprisingly greatly enhance permeation and diffusion of the key components through the walls of the selectively permeable membrane and away from the desired product. This inventive technique and apparatus for carrying out such technique are applicable to the production of dry air or other dry gases for use in any of the applications requiring dry gases as discussed hereinbefore.

The following U.S. PATS. disclose fluid separation techniques including gas drying, employing permeable membranes to effect the separations: Nos. 1,016,350; 1,496,757; 1,575,587; 1,620,864; 1,871,226; 2,400,940; 2,456,163; 2,506,656; 2,540,151; 2,540,152; 2,597,907; 3,019,853; 3,082,906; 3,188,563; 3,192,426; 3,208,198; 3,307,330; and 3,367,850.

The fluid separation techniques described in these patents do not employ a combination of pressure and concentration gradients or driving forces in a continuous process in accordance with the present invention to induce and enhance separation of selective components from mixed fluid feeds.

The continuous fluid separation techniques and permeation column apparatus of the invention has as one of its main advantages its simplicity. It is an entirely continuous passive process requiring no recycling valves, no timers, no heaters, no replaceable cannister or cartridge service problems. There are no spent corrosive solids or liquids to be replaced, regenerated, or disposed of as added pollutants to industrial waste. In their applications in drying air, there are no pollutants added to the wet or dry air, such as dust, odors, heat or chemical vapors and mists, as in prior art procedures. Furthermore, there is no liquid water to be drained inasmuch as it evolves as vapor.

The term "permeate" as employed herein refers to that fraction of the multiple component feed stream which penetrates, diffuses or permeates through the selectively or semi-permeable membrane.

The term "retentate" refers to the unpermeated balance of the feed stream or the product stream.

The terms "gas" and "gaseous" refer to not only materials that are conventionally considered to be gases, but also those materials conventionally considered to be vapors.

The term "selective" or "key" component as employed herein is used to designate the component or components which pass through the selectively or semipermeable membrane from a stream of mixed fluid feed material initially fed to the system.

DETAILED DESCRIPTION OF THE DRAWINGS

The invention may be more fully understood from the following description when read in conjunction with and with reference to the accompanying drawings in which:

FIG. 4 includes an outer guard over the apparatus and shows only the exterior of the product end.

Figure 15:
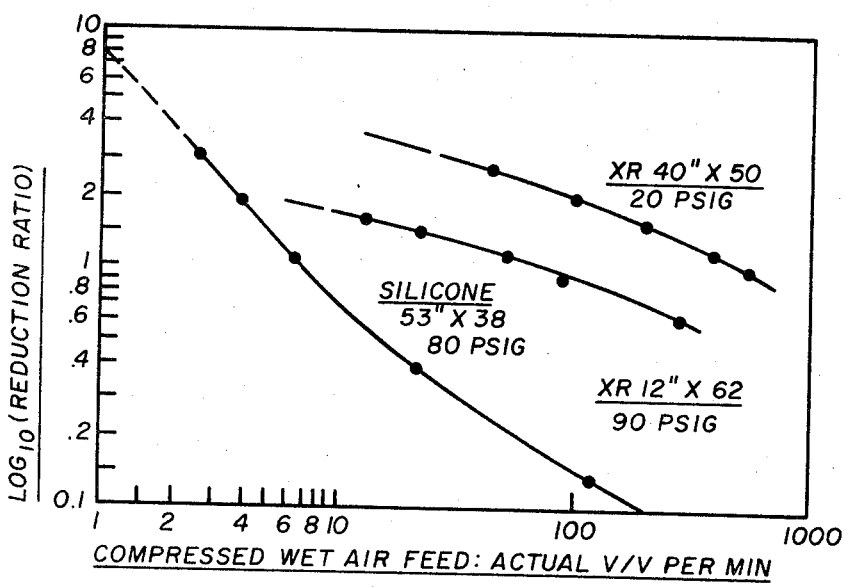

FIG. 15 graphically illustrates extreme product dryness obtained employing low feed flow rates in the process and apparatus of the invention.

SUMMARY OF THE INVENTION

Thus in accordance with the present invention, a continuous process is provided for separating selective or key components from multiple component fluid mixtures, which comprises (a) passing or flowing a multicomponent fluid mixture or feed stream including one or more key components, under a preselected initial relatively high pressure, along and in contact with the surface of a semi-permeable membranous hollow member or members, longer in length than in cross-section, and permeable to the selective or key components of the feed, (b) passing a second fluid stream under a lower pressure and different in composition than the feed, counter-current or in reverse flow to the feed stream and separated therefrom by the walls of the semi-permeable membranous hollow member (s), at a flow rate at least substantially equal to that of the feed stream to sweep away selective or key permeable components of the feed (permeate), thereby establishing a pressure gradient and a concentration gradient across and along the walls of the hollow member (s) and enhancing permeation of the selective, permeable components of the feed (permeate) through the walls of the hollow member (s) and into the second fluid stream, and (c) recovering fluid product (retentate) containing substantially less selective permeable components than present in the feed stream.

The said second fluid stream can comprise a portion of the product stream with or without additional purge fluid and therefore can be considered a reflux stream.

However, if desired, the second fluid stream may be independent of the product stream but should not include components which will permeate or penetrate the walls of the hollow member and contaminate the feed stream.

The continuous process of the invention is especially applicable to the drying of air and in this connection preferably comprises passing compressed wet air feed through one or a plurality of semi-permeable membranous hollow tubes longer in length than in cross-section and permeable to water vapor, passing a second gas stream or purge gas under a lower pressure than the feed stream and comprising a portion of retentate and/or a separate gas purge supply such as air containing a lower moisture content than the wet air feed, counter-current or in reverse flow to the feed and separated therefrom by the semi-permeable walls of the tubes, at a flow rate at least substantially equal to that of the actual wet air feed, to sweep away water vapor, thereby establishing a pressure gradient and a water vapor concentration gradient along the walls of the tubes and inducing and enhancing permeation of water vapor from the wet air feed through the walls of the tubes and into the second gas or purge stream, and recovering as retentate substantially dry air containing substantially less water vapor than present in the wet air feed.

In essence, the continuous process of the present invention utilizes the concept of creating a combination of a pressure difference and a composition difference between two counter-currently flowing fluid streams separated by the walls of selectively permeable hollow members or tubes. These pressure and composition differences, also referred to as pressure gradient and concentration gradient, act as driving forces to induce selective or key permeable fluid components of the feed to flow from the high pressure region, containing feed, through the semi-permeable walls of the hollow members or tubes to the low pressure region, containing the reflux and/or purge fluid, and thereby substantially removing selected key permeable fluid components from the feed.

It has been found that the combination of pressure gradient and concentration gradient as driving forces multiply the selective permeation phenomenon in much the same way that reflux in a long distillation column multiplies a small composition difference between liquid and vapor phases. Furthermore, this effect can be further multiplied many times by employing a series or array of tubes in an enclosed bundle.

In addition, in accordance with the present invention, an apparatus is provided for separating one or more selective components from multiple component fluid mixtures, comprising a semi-permeable hollow member having first wall means defining a first passageway and selectively permeable to selective components to be separated from fluid mixtures, second wall means defining a second passageway separated from the first passageway by the selectively permeable walls of said hollow member, a first fluid inlet means in communication with one end of the first passageway, a first fluid outlet means in communication with the first passageway at or near the end away from the first fluid inlet means, a second fluid inlet means in communication with the second passageway positioned near or at the end containing the first fluid outlet means, a second fluid outlet means in coMmunication with the second passageway positioned near or at the end containing the first fluid inlet means, so that feed fluid may flow through either of said first or second passageways and reflux or purge fluid may flow through the other passageway counter-current to the flow of the feed fluid.

Further, in accordance with the present invention, an apparatus is provided for continuously separating one or more selective or key components from multiple component fluid mixtures, comprising one or more semi-permeable hollow members or tubes in an array or bundle form, having walls selectively permeable to selective or key components to be removed from fluid mixtures and defining internal channels and including a feed end and a product end, an outer shell to confine the tube or tube bundle therein, the internal walls of the shell being in close proximity to the external surfaces of the tubes and defining a passage area around and between the tubes for carrying fluid in contact with and passed the external walls of the tubes, a fluid feed inlet means in communication with the feed end of the channels of the tubes, a retentate outlet means in communication with the channels of the tubes at the product end, reflux inlet means in communication with the area defined between the interior of the shell and exterior of the tubes, positioned near or at the product end, and reflux fluid outlet means in communication with the area defined between the shell and tubes, positioned near or at the feed end.

The retentate outlet means is preferably connected by means of a conduit, preferably containing pressure control or valve means, to the reflux or purge inlet means so that a portion of the retentate under a lower pressure than the feed may be recycled as reflux with or without external purge fluid.

The apparatus of the invention may, in addition, include an external purge fluid inlet means connected by means of a conduit containing pressure regulating means, to the reflux or purge inlet.

DETAILED DESCRIPTION OF THE INVENTION

Figure 1:
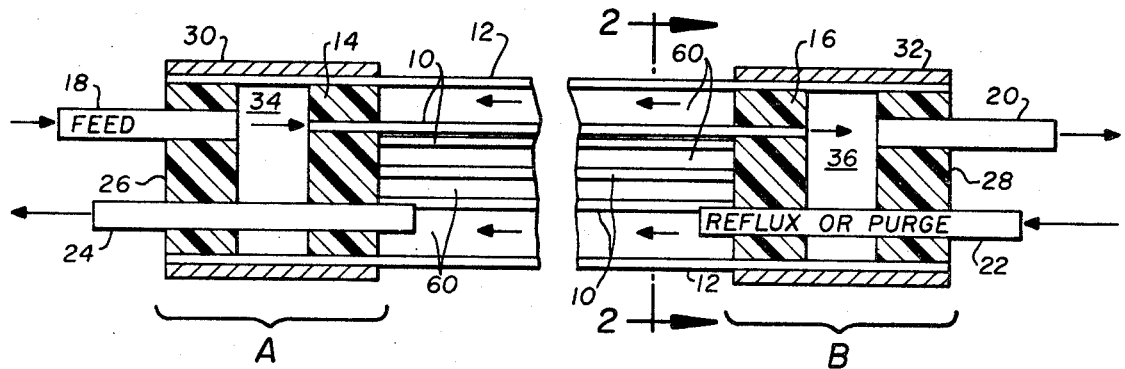
FIG. 1 is a schematic representation of an apparatus according to the present invention.
Figure 2:
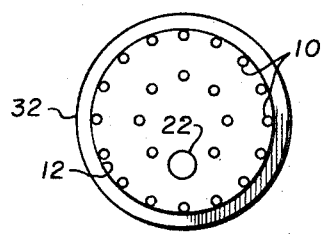
FIG. 2 is a cross-sectional view of the apparatus taken along lines 2—2 of FIG. 1.

A preferred embodiment of the apparatus is set out in FIGS. 1 and 2, wherein the numeral 10 designates a plurality of hollow permeation tubes in the form of a tube bundle having a feed end A and a product end B confined in a close fitting outside tube or shell 12. Each end of the tube bundle is retained by support means such as headers 14 and 16, respectively. The apparatus is equipped with conduit connectionS 18, 20, 22 and 24 provided for the passage of mixed fluid feed, product, and reflux or purge fluid. As shown, the numeral 18 designates a mixed fluid feed inlet line in communication with the hollow portion or channels of tubes 10 near feed end A. Retentate or product outlet 20 communicates with the tubes forming the product end B. Reflux or purge fluid inlet line 22 is in communication with the area 60 between and around the tubes 10 and the outside shell 12, and is located in close proximity to the product end B of the apparatus. Reflux or purge outlet line 24 is in communication with the area 60 between the tubes 10 and the outer shell 12 and is positioned in close proximity to the feed end A of the apparatus. The ends of the apparatus are sealed with end seals 26 and 28 and clamps 30 and 32 in accordance with standard procedures. The apparatus as shown in FIG. 1 also includes at the feed end A and the product end B a plenum or area 34 and 36, respectively. Plenum 34 serves to distribute mixed fluid feed from feed inlet 18 to each of the permeation tubes 10. Plenum 36 serves to collect retentate from permeation tubes 10.

Figure 3:
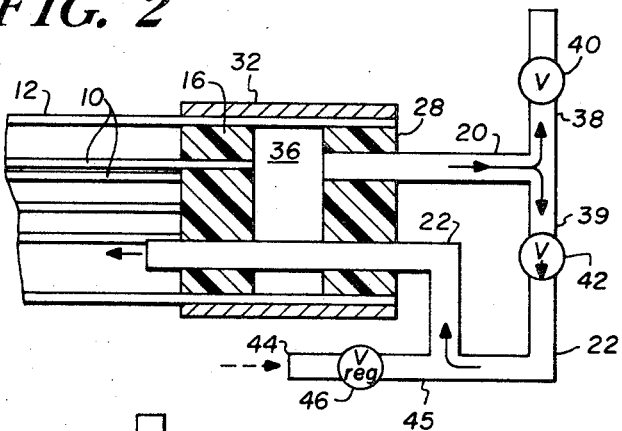
FIGS. 3 and 4 are schematic representations of the product end of the apparatus of FIG. 1, illustrating flow connections and controls as well as reflux and purge lines, adapted to accomplish the method of the invention.

Details of the product end B of the apparatus of FIG. 1 are shown in FIG. 3. As seen in FIG. 3, retentate outlet line 20 is in communication with product recovery line 38 and reflux inlet line 39, 22. Valve or orifice 40 is provided in product recoVery line 38 to control removal of product from the system. Valve or orifice 42 is provided in reflux line 39, 22 to meter and expand the balance of product or retentate from product outline line 20 to a low purge pressure, that is a pressure lower than that in tubes 10. Reflux inlet line 22 is also in communication with purge fluid inlet line 44, 45 which includes a control valve 46 which can be a combination pressure reducing regulator and flow control means to control the flow of external purge fluid into the reflux line 22.

In carrying out the process of the invention employing the apparatus of FIGS. 1, 2 and 3, a portion of the product in outlet stream 20 can be segregated and fed through control valve 42 to reduce pressure to a preselected amount and then fed through reflux line 22 into the area 60 between the tubes and outer shell 12. The reflux contains all product components at a lower total pressure so that each component of the reflux is therefore at a lower partial pressure than in the high pressure or feed or product phase. Thus, a pressure gradient and a concentration gradient of each component exists across and along the walls of the permeation tubes 10 which act as driving forces for permeation of selected or key components. If the permeatiOn tubes 10 are made of a material which has a relatively high perme-Ability for certain componentS such as water, carbon dioxide, carbon disulfide, carbon tetrachloride or acetylene, these components permeate the walls of the permeation tube at a much greater rate than others in the feed. Thus, the high pressure phase at the product end gradually becomes depleted and the reflux enriched with these easily permeating components. As the reflux travels counter-current in the shell area 60 back toward the feed end A of the tube bundle, its enrichment increases. Slowly, a transverse composition gradient is set up all along the tube bundle. Depending upon the nature of the semi-permeable tube material and the mixed fluid feed stream and the key components to be separated therefrom, a steady state is established in a period ranging fRom several hours to several days. The result is that the effluent product has a low concentration of the highly permeable components and the effluent reflux has a high concentration of the highly permeable components.

Alternatively, all of the product entering product outlet 20 may be withdrawn and recovered and an external purge supply may be employed. In this embodiment, the external purge fluid is fed into purge inlet 44 through pressure regulating valve 46 to reduce the pressure of the purge fluid to a preselected amount and the purge fluid then fed through conduit 45 into line 22 and into area 60 defined by the shell and the tubes. A similar pressure gradient and concentration gradient are thereby created along the walls of the permeation tubes thereby inducing and enhancing permeation of the selected or key components of the mixed fluid feed through the semipermeable walls of the tubes 10 and into the area 60 defined by the shell and the tubes.

Figure 4:
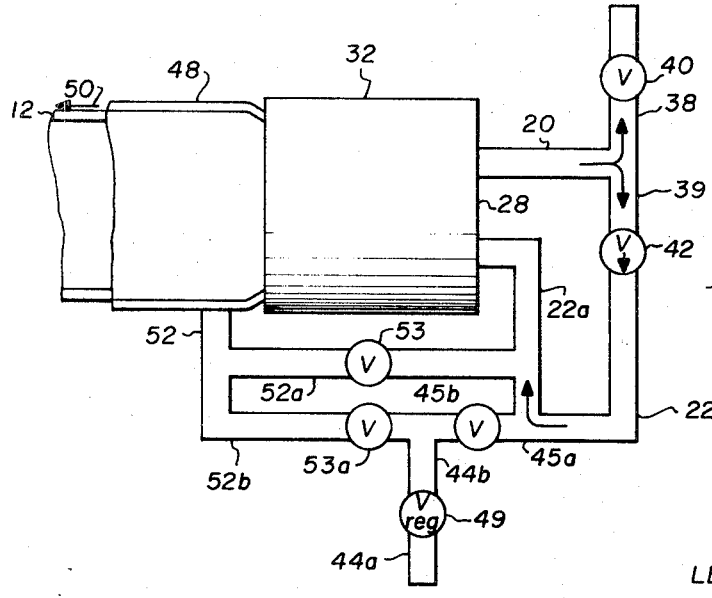

Another embodiment of the product end B of the apparatus of the invention is depicted in FIG. 4 wherein an external jacket or guard is employed surrounding the outer shell 12.

Referring to the apparatus of FIG. 4, a jacket or outer guard 48 in the form of a shell or outer tube, is positioned around outer shell 12 thereby defining a space or area 50 between the outer shell 12 and the jacket or outer guard tube 48. Conduti 52 is in communication with the area 50 between the outer shell 12 and the outer guard tube 48 and with reflux inlet line 52a, 22a, which includes flow control or valve means 53 as shown. Furthermore conduIt 52 is in communication with purge line 52b, 45a which includes flow control or valve means 53a and 45b as shown. External purge conduit 44a, 44b which includes pressure regulating means 49 is in communication with line 52b, 45a as shown. Valve 53 controls flow of reflux into conduit 52a, 52 and area 50 surrounding the outer shell 12. Valves 53, 53a and 45b can be adjusted to allow retentate to flow from reflux line 22 through conduit 45a and external reflux to be blended with retentate and the blend to flow into conduit 52 and into the space defined between the outer shell 12 and the outer guard tube 48. As will be apparent, valves 53, 45b, 53a and 49 can be adjusted to allow only external purge to flow into area 50. This embodiment is particularly useful where extremely low dew points are desired and the outer shell 12 may be slightly permeable to water vapor.

If desired, the embodiment of FIG. 4 may be modified by excluding external purge line 44a, 44b and pressure regulating means 49 as well as conduits 52b, 45a and the valves 53a and 45b.

The effluent reflux from the aforementioned processes and apparatus which has a high concentration of the highly permeable components may be discarded or, if valuable, compressed and/or condensed and put back into the high pressure mixed fluid feed phase, after removing condensate. Alternatively, if the permeated components present in the reflux phase or for that matter external purge phase, must be further concentrated, a stripper stage may be employed, with the raw feed point between the stripper and rectifier sections. The recompressed reflux, which has traversed both sections, is fed into the bottom of the stripper and highly concentrated permeated components therein can be withdrawn from the bottom of the stripper.

In large installations, expansion of the retentate at point 42 could be done in an expansion engine to provide refrigeration and mechanical power. The refrigeration would provide preliminary drying of the wet feed. The mechanical power could be coupled to the feed or purge effluent compressors.

The process and apparatus of the invention can be integrated into a continuous operating system designed to yield products of specified composition, from a designated feed stock. For example, a mixed fluid feed can be fed into a permeation column apparatus of the invention and a portion of the retentate allowed to reflux and pass counter-currently passed the permeable tubes carrying the feed. The key components of the feed permeates through the tubes and are swept away by the reflux or purge stream. The reflux including the permeate may then be fed to a stripper stage which yields a permeate still richer in the more permeable component and the retentate is similarly fed to another permeation stage or a stripping stage yielding a residue poorer in the more permeable component. Such a system closely resembles in many respects a fractionating complex in its flow line pattern. Furthermore, one can employ different membranes with differing permeabilities and selectivities in selected sections of the system to minimize the number of stages or maximize product purity.

The desired longitudinal concentration gradient created in the process of the invention may be made very large for essentially complete removal of highly permeable components, depending upon apparatus design, materials and choice of operating conditions. If the fluid feed is gaseous, the actual volumetric reflux flow rate or volumetric purge flow rate should exceed the actual volumetric feed flow rate, at all points along the system.

In fact, in accordance with the present invention, it has been found that where the process and apparatus of the invention are employed in the drying of air, the optimum purge/feed actual volumetric flow ratio is greater than 1 and preferably within a range of from about 1 to about 4.

Considering the method and apparatus described with reference to a specific procedure for drying a moist air stream as substantially typical, actual volumetric reflux flow rates can be calculated according to the following formula:

(1) $$R = \frac{(P/F \cdot (R+D))}{p_{Hi} p_{Lo}} \text{ or } P/F = \frac{R(p_{Hi}/p_{Lo})}{R+D} \geq 1$$

wherein R designates reflux flow rate measured in standard volumetric units per unit of time, such as scfm, D designates the part of the total product flow rate removed from the system for external use, measured in the same standard units as $R$, $p_{Hi}$ designates the full pressure in the high pressure phase at the product end of the system regardless of the way that the external product is removed, whether at full pressure, or by reduction through a valve or pressure regulator, and is measured in absolute pressure units, such as psia, $p_{Lo}$ designates the pressure in the low pressure phase at the end of the system into which the reflux or purge feed flows and is measured in the same absolute pressure units as $p_{Hi}$ such as psia, and $P/F$ designates the ratio of reflux or purge actual volumetric flow to feed actual volumetric flow and is equal to or greater than 1.

When the mixed fluid feed is a liquid, equation (1) takes a different form. Extra purge is needed if the volatile permeable components to be separated are compressed, when dissolved in the liquid feed. In the case where some of the liquid product is vaporized to serve as purge at $p_{Lo}$, the equation takes the following form:

$$eR = (P/F) \cdot (R+D) \cdot H_f$$

where $e$ is the volume expansion ratio of the purge upon being vaporized and brought to permeation column temperature, $H_f$ is Henry's solubility constant for the volatile permeable component expressed as a ratio of the space density of the component when dissolved to that in a vapor space in equilibrium with the feed, at the column temperature. With liquid feed, where the reflux fluid is a convenient gas or vapor, the purge should exceed the feed by $H_f$. With a convenient liquid for purge, $H_f$ will modify its minimum needed flow rate.

Figure 5:
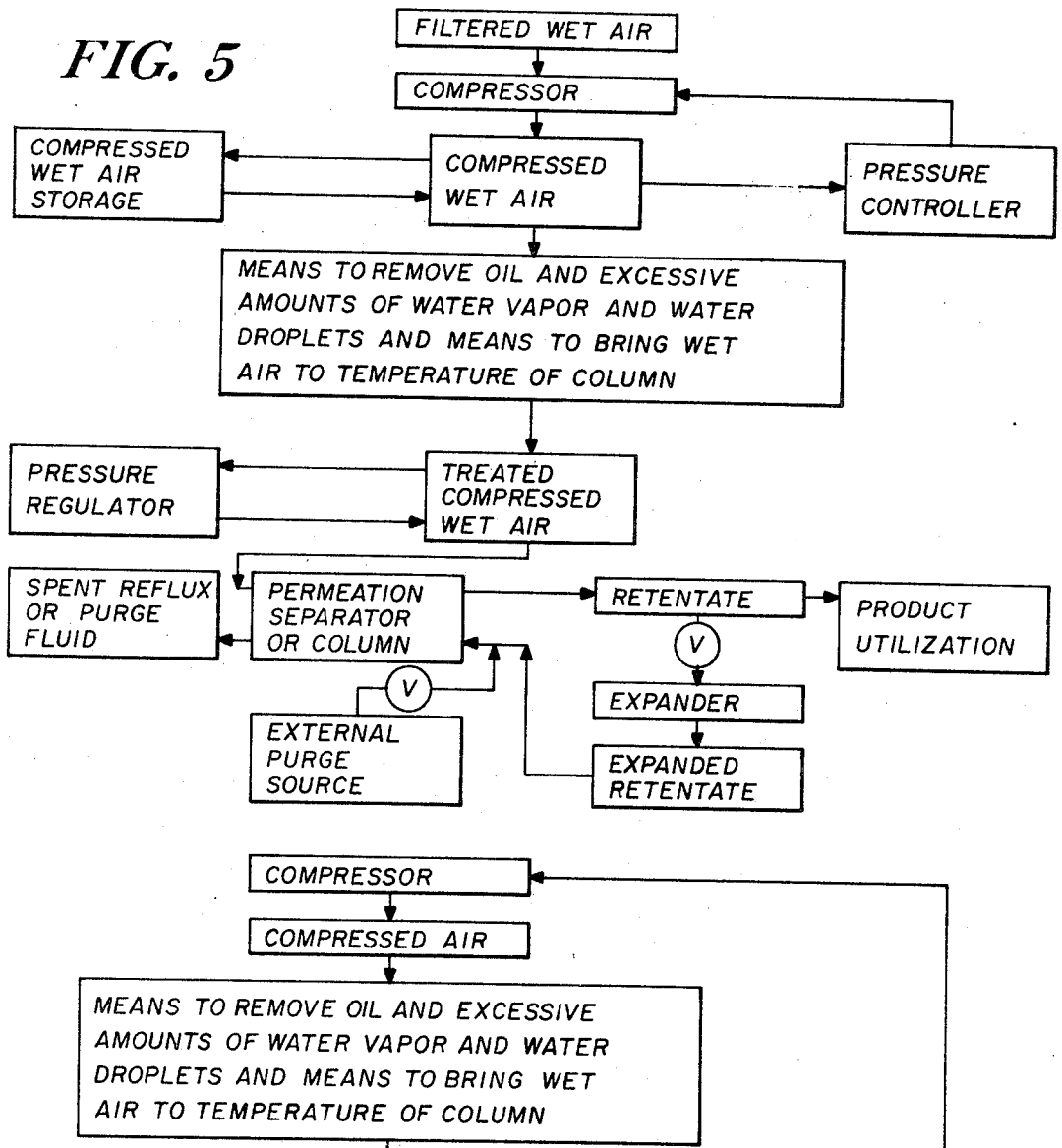
FIG. 5 illustrates a flow diagram in accordance with the process and apparatus of the invention for use in drying air and/or removing other gases from air.

FIG. 5 illustrates a flow chart of a substantially complete system built in accordance with the invention for separating mixed fluids and especially for removing moisture and/or other key components from air. Referring to FIG. 5, wet air is introduced into a compressor and compressed to a preselected relatively high pressure, such as, for example, within a range from about 50 psia to about 150 psia. The compressed wet air may be stored in a conventional storage means until ready for use. The compressed wet air may be further processed, if necessary, to remove oil such as by passing it through activated carbon or other conventional means, and to remove water droplets or excess moisture by passing it through a cooler, demister, filter, and/or water trap or other conventional means. After such treatment, the compressed wet air should not contain water droplets, but may still be saturated with water. The so-treated compressed wet air may now be introduced into the permeation separator column and process as described hereinbefore.

Figure 6:
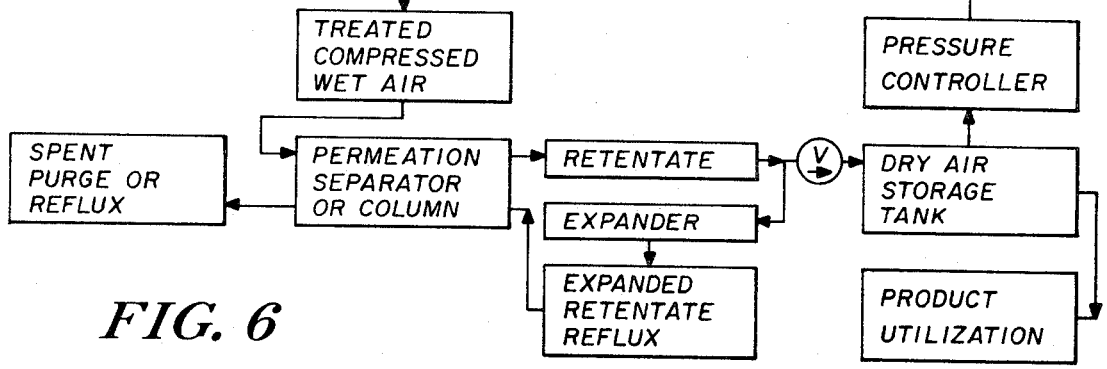
FIG. 6 is another embodiment of the invention for use in drying air as shown in FIG. 5 wherein dry air purge or reflux is proportional to dry air product use.

In time of little dry air use, such as at night, excess purge would put an unnecessary load on the compressor. If desired, the above-described permeation drying system may be adapted to provide purge or reflux proportional to dry air product use. In such case, an embodiment as shown in FIG. 6 may be employed. During the time the compressor is activated to replenish the pressure in the dry air storage tank, the permeation drying apparatus would be drying and purging. During compressor off periods, a check valve installed in the product storage tank line would not allow flow of product back from the tank and would stop the purge flow to the expander. The amount of the purge flow would be metered by a fixed adjustment, such as an orifice, suitable to the compressor output. This arrangement should provide purge proportional to dry air use.

Generally in carrying out the process of the invention, the pressures that can be used in the high pressure phase or mixed fluid feed phase are determined by the mechanical strength and dimensions of the permeable hollow members or tubes and the outer shell. Pressures ranging from about subatmospheric up to about 1,000 atmospheres are considered practical where a small diameter tubing from about 0.002 to about 0.5 inch or more in diameter is employed. The pressures in the high pressure phase and the low pressure reflux or purge phase may be sub-atmospheric, so long as a pressure gradient exists between the two phases. The lower pressure phase or reflux should be under a pressure ranging from about 98 percent to about less than 1 percent and preferably about 50 percent or lower of the pressure in the high pressure phase. Where an external purge is employed which is substantially devoid of permeable components, the external purge may be at any convenient pressure higher than, lower than or equal to the high pressure phase. Where the process of the invention is employed in drying air, the saturated vapor pressure of water at ambient temperatures may be employed as a lower limit for the purge pressure. Generally, in air drying applications, depending on equipment employed the high pressure or feed phase should preferably be under a pressure ranging from about 1,000 atm to about 2 atm abs. and the lower pressure phase should preferably be under a pressure of from about 50 percent or lower of the high pressure phase and preferably atmospheric pressure. However, it is understood that sub-atmospheric purge or reflux may be employed especially at close to atmospheric feed pressure.

With respect to operation temperatures and temperatures of the mixed fluid feed and the reflux or purge feeds, the upper and lower temperature limits depend on the thermostability and permeability maintenance of the permeable material employed. Accordingly, temperatures ranging from about −50° C to about +400° C may be employed. However, temperatures outside this temperature range limit can be utilized with specialized semi-permeable membrane material.

In the above process and apparatus, it is to be understood that the fluid feed may be introduced in the area defined between the outer shell and the tubes, that is through the shell, and the reflux or purge introduced countercurrently through the tube bundle. However, as a practical matter, it is preferred that the higher pressure phase, that is the mixed fluid feed, should be introduced inside the small hollow members or tubes rather than through the large shell to avert the necessity of designing shells to withstand high pressures.

The method and apparatus according to the present invention may be employed for the separation of gaseous materials such as the separation of water from air, the separation of rare gases from air, separation of carbon dioxide from air, separation of oxygen or nitrogen from air, separation of carbon disulfide from air, separation of moisture and carbon dioxide from methane (natural gas), separation of carbon tetrachloride from air, separation of acetylene from air and generally the separation of helium, hydrogen, nitrogen carbon monoxide, nitrogen oxides and argon from mixtures with larger molecule gases; for the separation of liquid materials such as the dehydration of propane (LPG), butadiene, isobutylene, alcohols, aromatic solvents and fluorocarbons as well as for the separation of gaseous and liquid materials such as decomposition products of sulfahexafluoride when used as a dielectric.

Where the mixed fluid feed is gaseous, it is theorized that the process by which the key or selective components passes through the permeable membrane is referred to as diffusion. However, where the mixed fluid feed is comprised of mixed liquids, it is theorized that the key liquid component which is to be separated from the remainder of the liquid feed, solubilizes in the membrane, diffuses in the membrane in the direction of the low pressure or reflux phase, and is desorbed from the membrane on the side of the membrane away from the mixed fluids and is swept away by the reflux.

The apparatus of the invention can take any convenient form or configuration depending upon the application required. It may be in the form of an elongated tube enclosed in a closely fitting elongated outer shell, so as to resemble the configuration of a shell and tube heat exchanger. The tubes and shell may be coiled or in stacked configuration where it is to be employed in areas of limited space. Furthermore, the entire apparatus or system or any component thereof may contain a protective casing or shell for mechanical protection.

It is to be understood that the apparatus of the invention can be employed with any conventional apparatus equipment to enhance performance and/or increase efficiency. Thus, for example, the mixed fluid feed line may include heating means to bring the fluid feed to the ambient temperature of the permeation separation apparatus to prevent liquid water from entering the permeation separator or to prevent freezing of the fluid feed lines. Furthermore, the reflux or purge fluid line may include heating means to increase purge or reflux temperature thereby reducing volume requirements of reflux or purge and increasing fluid feed temperature. Alternately, it may be desirable to cool both feed and purge streams to take advantage of an increased selectivity or permeability of the membrane at low temperature.

The semi-permeable membranous materials which can be employed in the present invention in the form of the aforementioned hollow members or tubes will permit passage of one or more key or selective components of the mixed fluid feed and offer high resistance or be impervious to passage therethrough of the other components of the mixed fluid feed. The semi-permeable membranous material should be chemically stable when in contact with the various components of the mixed fluid feed as well as the reflux and/or purge fluids. Furthermore, it should have sufficient mechanical strength and flexibility to withstand relatively high pressures and handling without breakage during shipment and in actual use in any separation procedure.

Normally, it will be required to tailor make the semi-permeable membrane for the particular separation application intended. The choice of semi-permeable membrane will depend upon the key or selective components desired to be removed from a mixed fluid feed, the composition of the remainder of the feed, and the permeation rate of key component therethrough required. The permeation rate of the key component through the permeable membrane is controlled by the chemical composition of the membrane, the temperature of the mixed fluid feed, surface area of the membrane, and membrane thickness. Selection of the membrane will vary depending upon whether the mixed fluid feed is gaseous, liquid or a mixture of liquid and gas.

Depending upon the separation operation contemplated, the semi-permeable membrane may be selected from such materials as polyethylene, polystyrene, Teflon, polysulfones, cellulose, esters, co-polymers of perfluoro (2-methylene-4-methyl-1,3-dioxolane) and tetrafluoroethylene, glass and metals which may be formed into membrane film or sheet by drawing or extruding these materials into films; cellophane and other cellulosic membranes which may be formed by regeneration of cellulose and its esters; polymers which are modified before film formation, such as polymers formed by sulfurchlorination of polyethylene, or combinations of any of the above.

Semi-permeable membranes which are particularly useful in the drying of air in accordance with the present invention include hydrophilic polymers wherein liquid water is dissolved and behaves as plasticizers for these materials, for example, perfluorosulphonic acid-, and salts thereof as well as silicones such as: dimethyl silicone, methylvinyl silicon, or methyl phenylsilicone, cellulosics such as cellulose acetate, and cellulose propionate or cellulose butyrate, Nylons such as Nylon IV, Nylon VI and Nylon VIII, as well as hydroxymethyl methacrylate and isocyanates such as copolymers of toluene diisocyanate and glycols or polyesters such as polyurethanes.

Hollow members or tubes of semi-permeable material should be substantially longer in length than in cross section. This is to insure that the proper concentration gradient can be maintained along the length of the tube. The cross section of the tubes can be of any convenient configuration such as circular, square, triangular, eliptical or other multi-sided or rounded configurations. Furthermore, the tubes can be corrugated to increase surface area of the semi-permeable walls. If desired, the semi-permeable materials can be coated and supported by a permeable backing such as fiberglass or metallic mesh or standard filter materials. Furthermore, the hollow member can have a honeycomb construction designed to carry the fluid feed and/or the reflux or purge.

The outer shell should have sufficient mechanical strength to withstand pressures between the tubes and the shell, and should be substantially inert to the components of the reflux fluid feed, purge fluid or components of the mixed fluid feed, if the feed is to flow through the shell as opposed to through the tube bundle. Thus, depending upon the separation contemplated, the outer shell may be made of material such as polyethylene, polypropylene, polyvinylidene chloride, various fluorocarbon polymers, butyl rubber, neoprene, metalized foils, such as aluminum or copper foils, metal tubing or glass. The outer tube or shell 12 is preferably constructed so that it is impervious to the surrounding environment and the fluids carried within.

The headers 14 and 16 are preferably constructed of plastics such as epoxy/polyamide, silicone, polyester, or flurocarbons but can be made of any rigid structural material which will support the tube bundle.

The end seals 26 and 28 are preferably made of an inexpensive plastic material such as polyethylene, polypropylene, fluorocarbons, butyl rubber, Buna-N or neoprene but may as well be constructed of any available conventional materials as will be apparent to one skilled in the art.

The fluid feed inlet, retentate outlet, and reflux or purge inlets and outlets may be constructed of a conventional tubing such as stainless steels, aluminum, copper, nylon or polycarbonates.

A typical permeation apparatus in accordance with the present invention can be constructed of inexpensive synthetic organic plastic materials. For example, in a typical drying column the permeation tubes may be made of dimethyl silicone, the headers of thermosetting epoxy/polyamide, the end seals of butyl rubber. The outer shell may be made of heat shrinkable polyethylene and covered by flexible aluminized tape. A clamp assembly of high pressure butyl tubing with metal strap clamps may secure the butyl rubber end seals.

Figure 7:
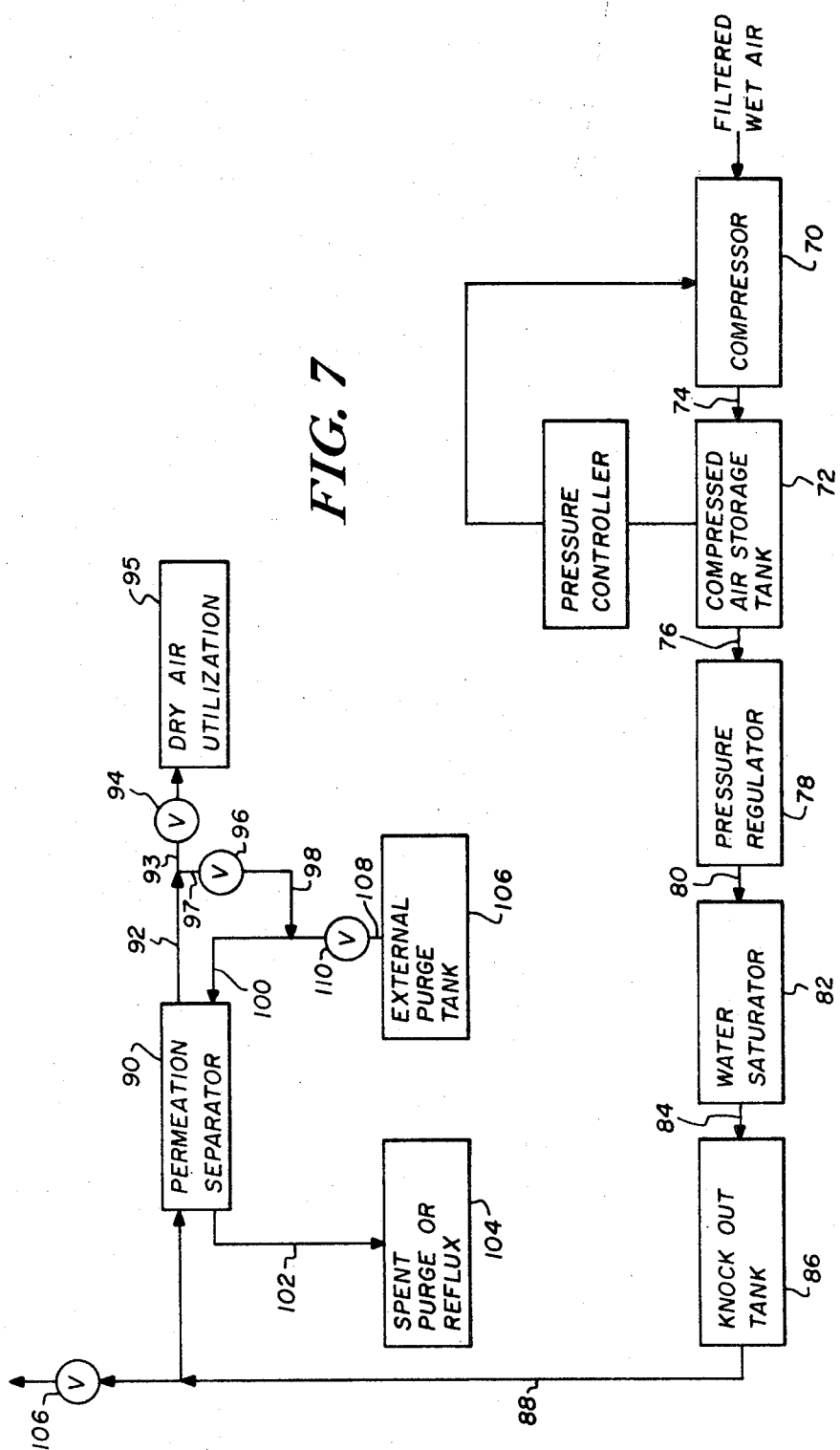
FIG. 7 illustrates a schematic drawing of a permeation air drying system as employed in the working examples.

The following Examples illustrate the process and apparatus of the invention. The apparatus used in carrying out each of the Examples is shown in FIG. 7 and is comprised of compressor 70 connected to compressed air storage tank 72 via conduit 74, the tank 72 being connected to pressure regulator 78 via conduit 76, the regulator 78 being connected to water saturator 82 and knock-out tank 86 via conduits 80 and 84. Knock-out tank 86 is connected to the permeation separator 90 of the invention via feed inlet line 88 which includes a wet air bypass line and vale 106. Product or retentate line 92 extends from separator 90 and is divided into two lines, line 93 which is in communication with dry air utilization system 95 (e.g. tank, conduit, etc.) and includes control valve 94, and line 97, 98 which includes flow control means 96 and which connects up with reflux or purge inlet line 100. External purge tank 106 is linked to purge inlet line 100 via line 108 which includes control valve 110. At the feed end, spent purge or reflux utilization 104 is linked to separator 90 via line 102.

In the drying of air in accordance with the invention, compressed air from storage tank 72 flows through conduit 76 and pressure regulator 78 through conduit 80, the water saturator 82, through conduit 84 into knock-out tank 86 and thereafter through conduit 88 into the permeation separator column 90 of the invention. Product outlet flows through conduit 92, 93 and may flow through valve 94 into dry air utilization means 95. A portion of the product from the separator 90 may be diverted by adjusting valve 94 for the desired external product flow and by flowing from outlet line 92 through conduit 97 and valve 96 adjusted to the desired purge flow and lines 98 and 100 into the permeation separator and passed countercurrently through the area between the outer shell and tubes and finally at the feed end through line 102 and into the atmosphere for flow and dew point measurements, generally indicated by the numeral 104. In lieu of a reflux purge, an external purge from external purge tank 106 can be made to flow through line 108, flow control valve 110 and into line 100, and subsequently into the separator 90 and thereby purge or sweep away permeable components from the mixed feed.

In the apparatus set up of FIG. 7, and that employed in the working examples, a commercial air-compressor tank combination is used. The compressor employs Teflon piston rings and supplies clean air with no odor or compressor oil mist. The pressure regulator 78 maintains the high pressure of the mixed fluid feed at the desired setting. The water saturator 82 and the knock-out drum 86 ensure 90 to 100 percent saturation of the compressed air at the desired pressure.

A fluid feed bypass valve 106 is in communication with line 88 and operates to sample wet compressed air feed for atmospheric pressure dew points measurements. The pressure at the purge inlet 100 is slightly above atmospheric pressure to overcome flow resistance. The purge effluent out line 102 is vented (104) to dew point and flow measuring apparatus (not shown). Flow rates and atmospheric dew point measurements are made with wet test meters and dew cups.

It is to be understood that in the apparatus of FIG. 7 as well as all other embodiments contemplated herein, where reflux or purge is at sub or super-atmospheric pressure, it is desirable to include pressure reducing regulating means in place of flow control or valve means 96 and include flow control means in line 102.

EXAMPLE 1

The apparatus set up as shown in FIG. 7 is employed. The permeation separator used contains a tube bundle the tubes of which are made of XR perfluorosulfonic acid "H+" ionic form having an outside diameter of 0.035 inch, an inside diameter of 0.025 inch and a wall thickness of 0.005 inch. The tube bundle is 12 inches long and contains 62 tubes having a combined internal volume of 6.0 cm$^3$. The outer shell employed is a close fitting glass having an inside diameter of about three-eighths inch. This apparatus is referred to as "XR 12" × 62" in the accompanying Figures.

Initially, a wet air feed is employed at a pressure of 40 psig. The external product flow rate [D in the equation (1) discussed hereinbefore] is adjusted to 0.041 room cfm and the purge flow rate [R in the equation (1) set out hereinbefore] adjusted to different values during 4 days of continuous operation.

Figure 8:
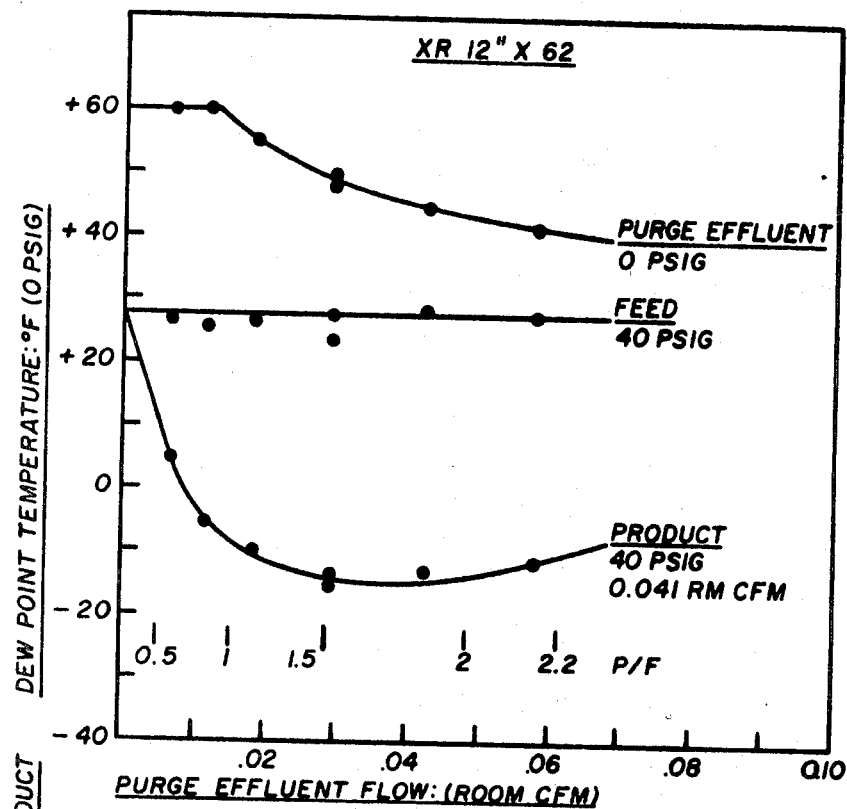
FIG. 8 is a graphic illustration of the results obtained by an operation according to the present invention, wherein the system is employed in drying air.

The results obtained employing the above procedure are set out in FIG. 8 wherein the purge effluent flow rate (R) in room cfm is plotted against dew point temperature of the purge effluent at 0 psig, the mixed fluid feed and product being at 40 psig. As shown, the lowest dew point of the product, that is −15° F., is obtained at a purge effluent flow of about 0.028 room cfm. Accordingly, when the values for purge flow (R), external product flow rate (D) and the pressure in the high pressure phase that is the pressure of the wet air feed ($p_{Hi}$) and the pressure in the reflux phase or low pressure phase ($p_{Lo}$) are inserted in equation (1) set out hereinbefore, the optimum purge/feed actual volumetric flow ratio for this system is found to be 1.5

$$0.28 = [(P/F) \cdot (0.028 + 0.041)]/[(40 + 14.7)/14.7]$$
$$P/F = 1.5$$

Similar calculations are made employing other purge flow rates (R) as shown in FIG. 8. These results are set out in FIG. 8 above the purge effluent flow abscissa units.

As can be seen in FIG. 8, where a purge in excess of the optimum, that is higher than 0.028 room cfm, is employed, the product has a slightly higher dew point, thus a slightly higher water concentration. Employing a purge less than 0.028 room cfm or optimum causes the product to rapidly increase in dew point temperature and thus rapidly become wetter, especially after the $P/F$ ratio decreases below 1. The reason for this can be seen from the dew point measurements of the purge effluent, which rises to the maximum value that it can have at 60° F or room temperature. When the *P/F ratio is less than* 1, apparently, water vapor in the saturated high pressure feed permeates the tubes to saturate the purge effluent and thereby inhibits further permeation of water vapor through the tubes into the purge effluent. On the other hand, when the *P/F ratio exceeds unity, the purge effluent begins to have a smaller partial pressure of water vapor than exists in the high pressure feed so that a driving force, namely a water vapor concentration gradient, for permeation exists at the mixed fluid feed entrance point. Thus, the permeation separator is more fully utilized from end to end. Purge in excess of the optimum, that is, in excess of* 0.028 room cfm, acts as an unnecessary added load on the drying system.

Figure 9:
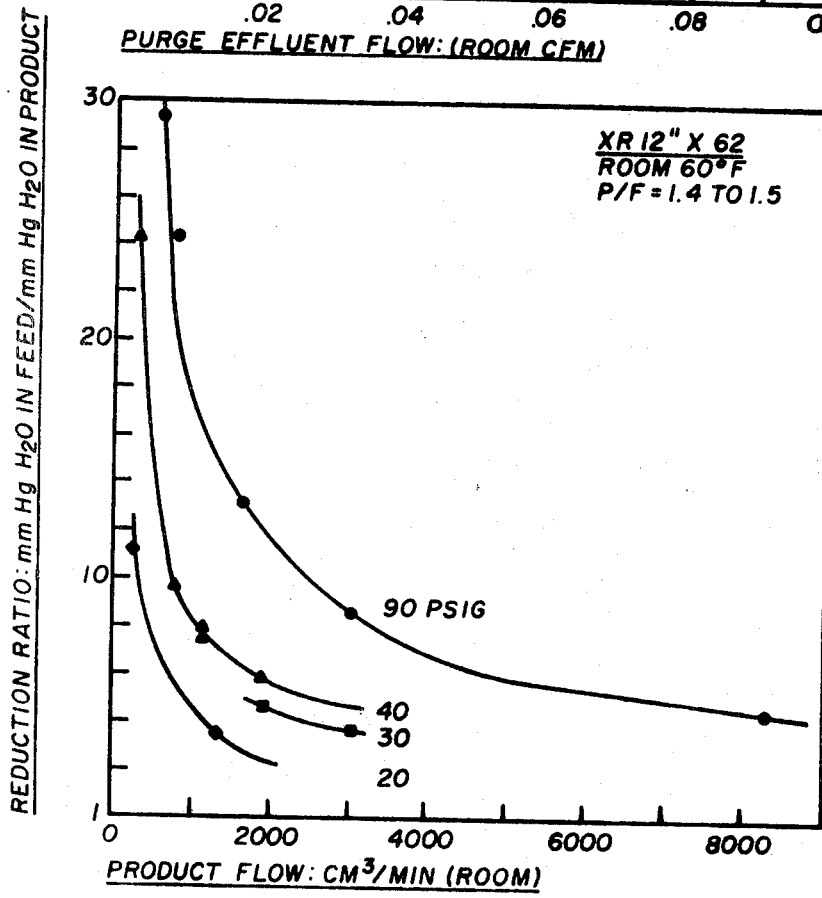
FIG. 9 illustrates graphically the effect of different product flows and pressures on the drying capacity of an apparatus in accordance with the invention.

In further experiments, $P/F$ is held constant between 1.4 and 1.5, while the external product flow rate (D) is varied between 150 and 8,000 room cm³/ᵐⁱⁿ, and the mixed fluid feed pressures or high pressure phase varied between 20 and 90 psig. The optimum $P/F$ ratio for this permeation separator apparatus under these conditions employing equation (1) is found to range from 1.4 to 1.6. In FIG. 9, product flow in cm³/ᵐⁱⁿ (room) is plotted against water vapor reduction ratio that is mm Hg H₂O in feed/mm Hg H₂o in product. The higher the water vapor reduction ratio, the drier the air product. As shown in FIG. 9, high feed rates, that is, high product flows, give low water vapor-air separations and low feed rates (that is low product flows) give high separations. Under these conditions, the highest reduction of water vapor in the product is 29.4 employing a feed or product at 90 psig, product flow rate of 445 cm ³/ᵐⁱⁿ, a purge flow rate of 118 room cm³/ᵐⁱⁿ, $P/F$ ratio of 1.52, and 60° F. room temperature. In this run the zero psig dew points of feed, product and purge effluent are found to be + 15° F., −45° F., and +49° F., respectively.

Since the internal volume of the tube bundle is 6.0 cm³, the total feed represented 13.1 V/V per minute (actual volumes of feed per volume of internal tube space per minute). Feed residence time is therefore 60/13.1=4.6 seconds. The compressed air travels through the 12 inch tubes with a space velocity of 13.1 feet per minute. During the passage 97 percent (=100 (29.4 − 1) / 29.4) of the water vapor is removed.

At the highest feed rate tried useful drying at 90 psig. is still obtained, with moisture reduction of 4.4 in the product. Compared to the lowest flow rate, the product and purge flows are 18.7 times larger, at 8,330 and 2,310 cm³/ᵐⁱⁿ. The feed, product, and purge effluent dew points are +14.5° F, −13.9° F, and +49.1° F, respectively. Here, the feed throughout is 248 V/V per minute, residence time 0.24 second, and space velocity 248 ft./min. Thus, in about one-fourth second, 77 percent (=100 (4.4 − 1)/4.4) of water is removed. The water material balance is 115 percent, showing slightly more water coming out than going in. This indicates slight errors of measurement or that steady state has not quite been reached in 3 hours of operation under the above conditions.

The above data and FIGS. 8 and 9 clearly show that the air drying system of the invention is highly efficient and yields excellent results.

EXAMPLE 2

The following Example illustrates the use of the process and apparatus of the invention in the drying of air employing an apparatus that is similar to that described in Example 1, with the exception that the permeable tube bundle employed is 40 inches long and contains 50 tubes made of XR perfluorosulfonic acid, the total internal volume of the tubes being 16.1 cm³ and the outer shell or tube being made of heat shrunk polyethylene having a wall thickness of 0.030 inch and inside diameter of three-eighths inch. Thus, the permeation separator column employed in Example 2 is about 3.33 times longer than that employed in Example 1. This apparatus is referred to as "XR 40" × 50" in the accompanying Figures.

Figure 10:
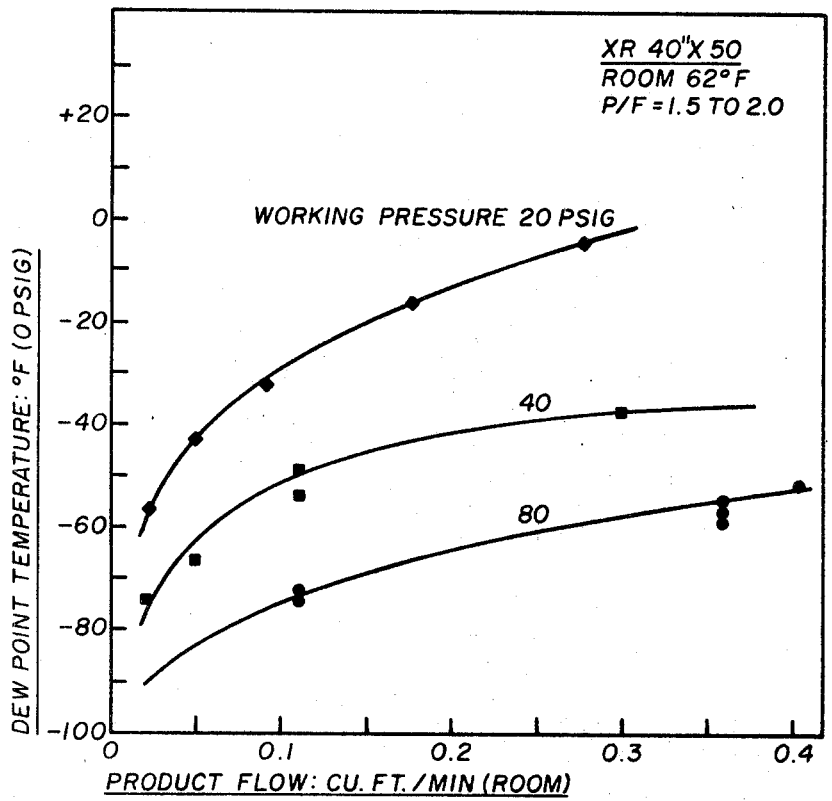
FIG. 10 is a graphic illustration of product dew points obtained with an apparatus of the invention for different product flow rates and pressures.

In this example, the $P/F$ ratio is held constant between 1.5 and 2.0, while the external product flow rate (D) or mixed feed flow rate at pressures of 20, 40 and 80 psig is varied. The results obtained are shown in FIG. 10 wherein product flow rate is plotted against dew point temperature of products at the various working pressures of 20, 40 and 80 psig. In all of the runs, the purge phase is essentially at atmospheric pressure ( 0 psig).

As shown in FIG. 10, the lowest product dew points occur with the lowest flows and highest pressures. At 80 psig, product flows of 0.1 and 0.4 rm, cfm, shows product dew points of −77° F. and −52° F., respectively. The compressed air feed is 90 to 100 percent saturated at 58° to 64° F., the room temperature. These results are well within the area of commercial adsorption drying systems.

The optimum purge/feed actual volumetric flow ratio found is about 1.5 in 20 and 40 psig operation. With 80 psig operation a $P/F$ ratio of 2.0 is needed to give the lowest product dew points.

Figure 11:
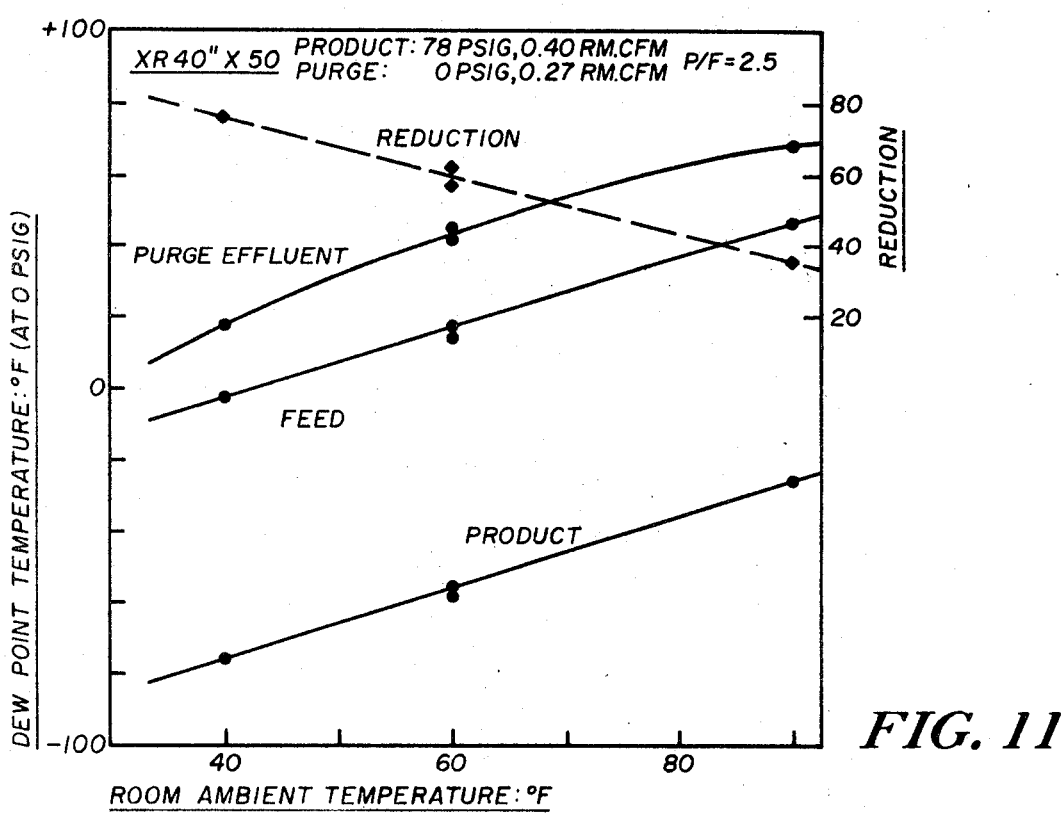
FIG. 11 is a graphic illustration of the overall effect of room temperature on an air drying system.

In another series of runs employing the apparatus of Example 2, the room temperature in which the air drying procedure is carried out is changed and ranges from 40° to 87° F. All of the apparatus, including the compressor, water saturator, permeation column, wet test meters, etc. are allowed to come to equilibrium with the changed room temperature before readings are taken. The product and purge flow rates are kept constant at 0.40 room cfm and 0.27 room cfm, respectively, with a $P/F$ equal to 2.5. A feed or product high phase pressure of 78 psig is employed. The overall effect of temperature on the entire working system is shown in FIG. 11 wherein room ambient temperature in °F. is plotted against dew point temperature in °F. for the product, the feed and purge effluent. In addition, reduction ratio, that is mm Hg $H_2O$ in feed/mm Hg $H_2O$ in product, is plotted on the right side ordinate of this graph.

As seen in FIG. 11, a rise in room temperature of 47° F., from 40° to 87° F., causes a similar 46° F. rise in the product dew point, from −75° to −29° F.

With respect to the temperature effect on the water vapor reduction ratio, it is seen that reduction diminishes from 80 at 40° F. to 36 at 87° F. This corresponds to about 5 kilocalories per mol for the exponential energetic temperature coefficient of the separation. The partial pressure of water in the feed is 4.6 and 43.2 mm Hg. at the two temperatures. The large 9.4 fold increase in the amount of incoming water, diminishes the reduction by a small factor of 2.2. The ability to handle a large increase of incoming water vapor without break through or excessive rise in the product dew point, is a superior feature of permeation drying. It compares favorably with adsorption drying systems using heat regeneration, where the required amount of solid desiccant is usually doubled if the incoming water is doubled.

EXAMPLE 3

A. To test further the improved air drying results with increased tube length in the permeation column of Example 2, a second permeation column (referred to as XR 39.5"× 50) is installed in series with the first (XR 40" × 50 of Example 2). The combination of permeation columns containing a tube bundle of 50 tubes each having a total length of 79.5 inches gives only fair results. Roughly, twice the total product flow rate could now be obtained at the same product dew point. This is what can be expected if the columns are put in parallel with each other. It is evident that the second column, receiving the relatively dry output of the first one, is unable to produce as large a reduction in the water vapor.

Figure 12:
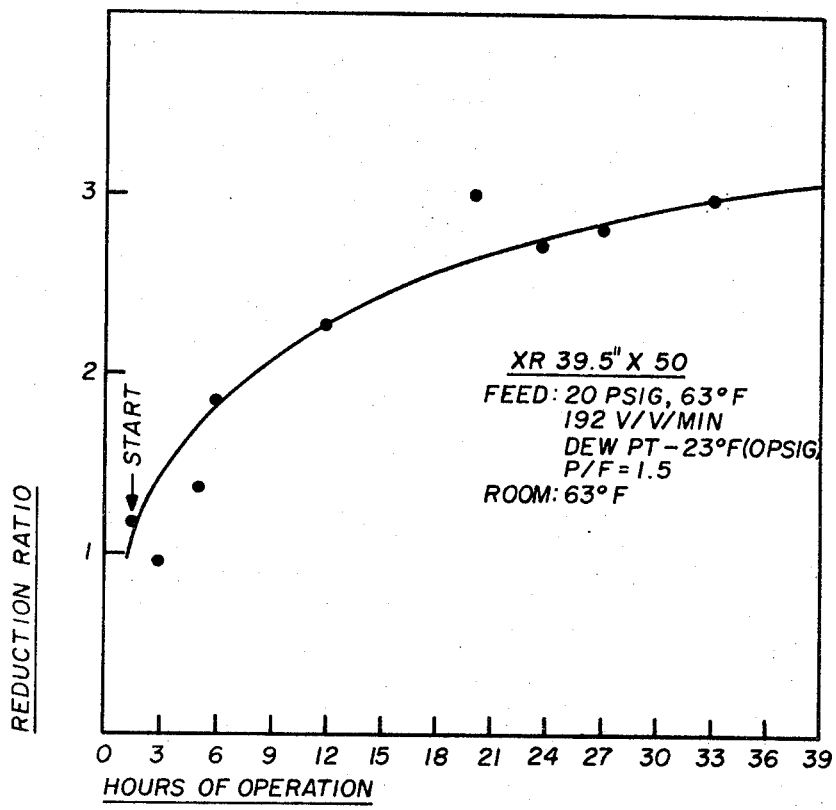
FIG. 12 illustrates graphically the drying of fairly dry air feed employing the process and apparatus of the invention and further illustrates the time of coming to steady state operation.

B. To confirm the fact that drying efficiency decreases where relatively dry feeds are used, the XR 39.5" × 50 column is run at 20 psig employing a fairly dry feed (−23° F. dew point) and with a very dry feed (−74° F. dew point). In FIG. 12, hours of operation is plotted against water vapor reduction ratio (mm Hg $H_2O$ in feed/mm Hg $H_2O$ in product. FIG. 12 shows that about 36 hours of operation is needed to establish steady state conditions with the fairly dry feed (−23° F. dew point). The reduction achieved is only 3.0 compared to 39 with a saturated feed. Both are obtained with a feed of 192 V/V per minute and at 63° F. room temperature.

Figure 13:
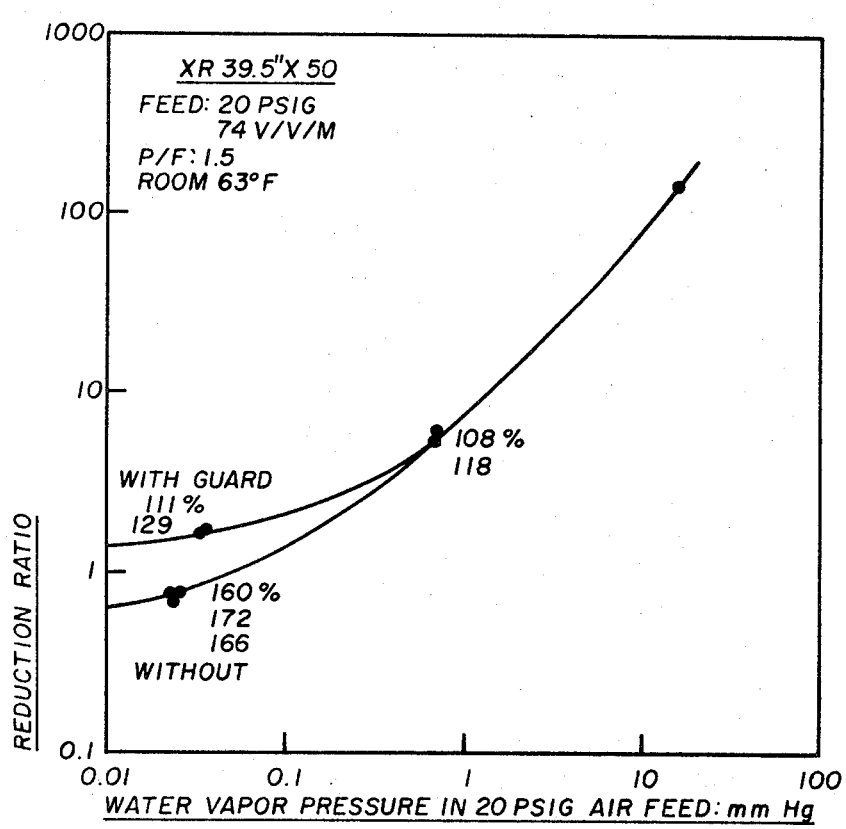
FIG. 13 illustrates graphically the effect of employing drier feeds and the use of a purge guard around the external walls of an apparatus of the invention.

Going to lower feed rates of 74 V/V per min., the reduction again is measured with the results shown in FIG. 13 wherein water vapor pressure in 20 psig air feed (mm Hg) is plotted against reduction ratio. FIG. 13 shows that with a very dry feed, the reduction goes below unity, showing the product wetter than the feed. Water material balances of 160 to 172 percent, shown in FIG. 13, indicates more water coming out than going in. The difficulty is traced to permeation of room moisture through the polyethylene outer tubing.

It is evident from FIG. 13 that as the partial pressure of water vapor is lowered in a constant feed at room temperature, the water separating ability becomes less and less. The drier the semi-permeable XR material (perfluorosulfonic acid) becomes, the lower is its permeability for water vapor. Thus, very long columns are need for extreme product dryness. However, the XR material (perfluorosulfonic acid) has good wettability to effectively catch water mist, and high capacity for drying gases to −80° F., the area of commercial adsorption driers.

EXAMPLE 4

In order to prevent the permeation of room moisture through the polyethylene outer shell of the permeation column employed in Example 3, a polyethylene guard or outer shell is fitted around the whole permeation column, as shown in FIG. 3. This apparatus setup is employed with a very dry feed (−74° F. dew point) and a feed flow rate of 74 V/V per min., a P/F ratio of 1.5 at a room temperature of 63° F., the feed being under 20 psig. The guard is fitted around the permeation apparatus of FIG. 3, so that a concentric space is defined between the outer guard and the outer shell of the permeation column, and a small amount of product is purged back through the concentric guard space. FIG. 13 shows that with this setup, the reduction ratio remains above 1, thereby indicating that permeation of room moisture through the polyethylene outer shell is eliminated. FIG. 13 shows that the use of the purged guard around the whole permeation column brings the measured reductions from below 1 to 1.4.

EXAMPLE 5

A. The process and apparatus of the invention are employed in the drying of air. The same apparatus setup as described hereinbefore is used. However, the permeation drying column is varied by varying the semipermeable material used in the tube bundle. In this example run, the tube bundle employed is made of dimethyl silicone, the tubes having an outside diameter of 0.065 inch, an inside diameter of 0.025 inch, a wall thickness of 0.020 inch. The bundle is 53 inches long containing 38 tubes having a total internal volume within the tubes of 16.2 $cm^3$. The outer shell employed is made of heat shrunk polyethylene three-eighths inch I.D., 0.30 inch wall thickness, plus aluminized tape.

B. In a second run, a permeation column contains Nylon 101 tubes having an outside diameter of 0.072 inch, inside diameter of 0.042 inch and a wall thickness of 0.015 inch; the tube bundle contains 25–54 inch tubes and has a total internal volume of 30.5 $cm^3$. The outer shell is made of ½ inch heat shrunk polyethylene.

Figure 14:
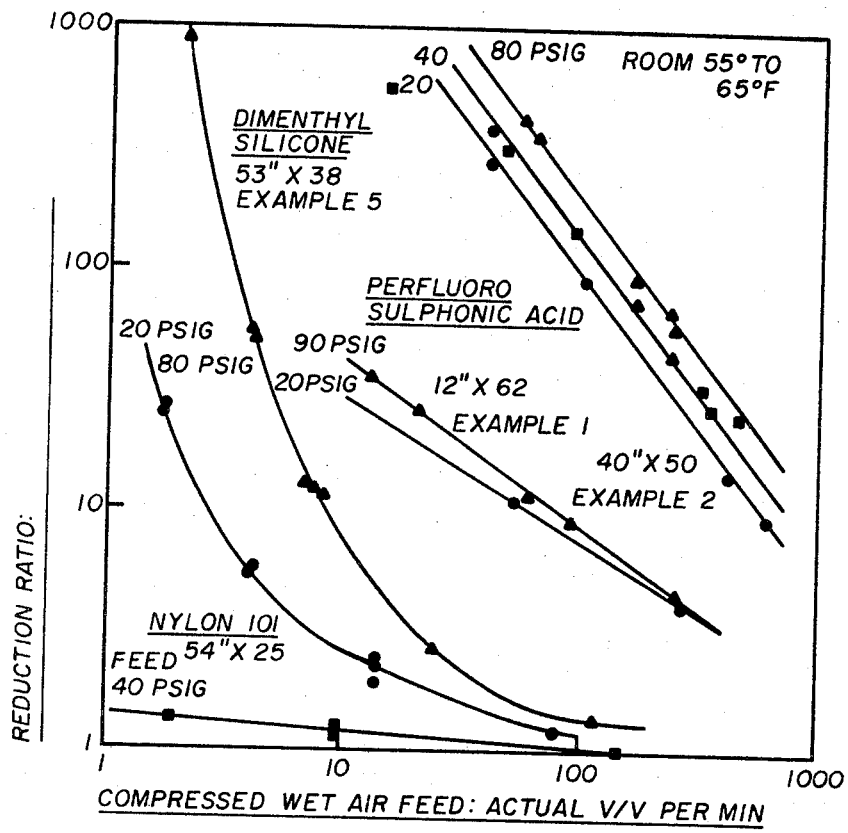
FIG. 14 illustrates graphically operating data employing various permeation materials in drying columns in accordance with the invention.

The relevant data obtained are shown in FIG. 14, for perfluorosulfonic acid as used in Examples 1 and 2, dimethyl silicone and Nylon 101. In FIG. 14, the observed reductions are plotted against the actual volumetric feed flow per internal volume of the tube bundle, termed actual V/V per minute. This unit is proportional to the rate of incoming water vapor in the saturated feed. The P/F ratio is between 1.4 and 3.

With dimethyl silicone, a large increase in the moisture reduction results from working at higher feed pressure. With the perfluorosulfonic acid material, only a small desirable effect occurs with increased pressure.

In the log-log plot in FIG. 14, data for perfluorosulfonic acid material are straight lines, while those of silicone curve upwards sharply with reduced feed rate. With the 53" × 38 dimethyl silicone column, the highest reduction achieved is 870. This product has a dew point of −90° F. This represents 99.89 percent (= 100(870−1)/870)water removed by the column. The data in FIG. 14 confirm the operational reality of permeation columns of the invention for drying compressed gases.

Extrapolation to lower feed rates is more conveniently shown in FIG. 15, where the $\log_{10}$ of the reduction versus the wet air feed rate is plotted on a log-log graph. On the vertical scale, 1.0 means that the reduction is 10, 2.0 means that the reduction is 100, etc. The data are the same as shown in FIG. 14. With the silicone material, the curve in concave upwards. At a feed rate of 1 V/V per minute, the reduction is $10^7$. Estimated residual moisture in the product would be one ten millionth of the moisture in the wet feed.

The curves for perfluorosulfonic acid material are concave downward in FIG. 15. The use of low feed rates to achieve extreme product dryness is not very effective with perfluorosulfonic acid material. A combination of perfluorosulfonic acid and dimethyl silicone columns would apparently be best for extreme low dew points at high flow rates. The perfluorosulfonic acid section would remove the major part of the feed moisture. The dimethyl silicone section whose permeability for water vapor evidently does not depreciate at low water levels, would then carry the product moisture to extreme low levels.

EXAMPLE 6

In order to show the use of the process and apparatus of the invention in separating carbon dioxide and oxygen as key or selective components from wet air, the following example is carried out. The apparatus setup employed is as described in Example 5, employing dimethyl silicone permeation material in the permeation column containing 38 tubes, 53 inches in length. Compressed air at a pressure of 79 psig and under a flow rate of 2.1 V/V per min. is fed into the permeation column. The purge/feed ratio employed is 3.2. After three days of operation, the product having a −90° F. dew point is recovered. An analysis of the product shows that carbon dioxide in the feed is reduced by a factor 2 and oxygen in the feed is reduced by a factor of 1.06. The oxygen in the feed is 20.9 percent and the dry product 19.7 percent by volume.

EXAMPLE 7

The permeation separation apparatus of Example 6 is employed in the separation of oxygen and carbon dioxide from air. Compressed air at 79 psig at a flow rate of 0.59 V/V per min. is fed into the column. A residence time over 100 seconds is used. The actual purge/feed ratio employed is a function of position along the column, being 3.53 at the feed end and zero at the product end. At a point 15 percent of the column length back from the product end, the P/F ratio is 1.0. Analysis of the product shows oxygen reduced by a factor of 1.28 from 20.9 percent to 16.4 percent. Oxygen increases to 24.6 percent in the purge effluent. Feed/product carbon dioxide reduction is 8.2.

The data of this Example indicates that to effect appreciable composition changes in components less permeable than water, longer residence times and/or longer columns should be employed.

What is claimed is:

1. An apparatus for separating one or more key components from multiple component fluid mixtures, said apparatus comprising a permeable perfluoro sulfonic acid polymeric hollow member having walls defining internal channels selectively permeable to those key components which are to be removed from said fluid mixtures; outer shell means capable of confining the said hollow member therein, said shell means being positioned so that the internal walls of said shell means are in close proximity to the walls of said hollow member, thereby defining a passage area around and between the hollow member and the shell means capable of carrying a fluid in contact with said walls of said hollow member; first fluid feed inlet means in communication with one end of the internal channels of said hollow member; first fluid outlet means in communication with said internal channels of said hollow member and positioned at an end opposite to said feed inlet means; second fluid inlet means in communication with the passage area defined by said shell means and said hollow member capable of carrying reflux or purge fluid therethrough, said second fluid inlet means being positioned near or at the end containing the retentate outlet means; second fluid outlet means in communication with the passage area defined by said shell means and said hollow member positioned near or at the end containing said feed inlet means and first conduit means for connecting said first fluid outlet means to said second fluid inlet means.

2. An apparatus according to claim 1 further including a pressure regulating means located in said conduit means for maintaining the pressure of said reflux or purge lower than said feed whereby a portion of the retentate may be recycled as reflux.

3. An apparatus according to claim 1 wherein the external purge fluid inlet means is positioned in communication with said second fluid inlet means.

4. An apparatus according to claim 1 further including a guard shell means surrounding and closely fitting said outer shell whereby an open area is defined between said guard and said outer shell; second conduit means located in close proximity to the retentate end in communication with said open area defined by said guard means and said outer shell and connected to either the external purge source or the retentate outlet means or the reflux inlet means; outlet means located in close proximity to said feed inlet means.

5. An apparatus in accordance with claim 1 wherein said hollow member comprises a plurality of tubes formed as a tube bundle wherein the tubes of said bundle are longer in length than in cross-section.

6. An apparatus according to claim 4 wherein said tube bundle is bent into any convenient shape.

7. An apparatus according to claim 1 further including a sealing means located at each end of said hollow member for sealing said internal channels of said hollow member from said passage area defined by said hollow member and the internal walls of said shell means.

8. A system for separating moisture from fluid wet with water, said system comprising wet fluid compressing means to raise the pressure of wet fluid feed to a preselected relatively high pressure; an apparatus according to claim 1 for separating moisture from said wet fluid connected to said compressing means; a relatively dry fluid product storage means connected to the outlet means of said apparatus; dry fluid expander means connected to said outlet means of said apparatus; a pressure sensing means responsive to said pressure of the dry fluid in the storage means for controlling said compressing means; check valve means positioned in said dry fluid storage means for preventing flow of dry fluid back from said dry fluid storage means.

9. A process for selectively separating key components from multiple component fluid mixtures, said process comprising the steps of passing a multicomponent fluid feed including one or more of said key components under a preselected, initially relatively high pressure along and in contact with a wall of a permeable perfluoro sulfonic acid polymeric membranous hollow member, said hollow member being longer in length than in cross section and said permeable polymeric membranous material being selectively permeable to said key components contained in said feed; countercurrently passing a second fluid stream relatively free of said key components under a lower pressure and having a different composition than the feed and separated therefrom by the wall of said polymeric permeable membranous hollow member; controlling the flow rates of both the feed stream and the second fluid stream so as to maintain a concentration gradient along the entire length of said permeable polymeric hollow member thereby enabling key permeable components of the feed to permeate through the walls of said polymeric hollow member and into said second fluid stream; recovering fluid retentate containing substantially less selective permeable components than present in the feed stream.

10. A process according to claim 9 wherein the actual volumetric flow rate of the second fluid stream is maintained at least substantially equal to the actual volumetric flow rate of the feed stream.

11. A process according to claim 9 wherein the second fluid feed actual volumetric flow ratio employed is within the range of from 1 to total reflux.

12. A process according to claim 9 further including the step of employing either a portion or all of the retentate stream as the second fluid stream.

13. A process according to claim 9 further including the step of employing an external purge fluid stream as the second fluid stream.

14. A process according to claim 9 for separating carbon dioxide from fluids.

15. A process according to claim 9 for separating water and carbon dioxide from hydrocarbon fluids.

16. A continuous process for separating moisture from wet fluids which comprises the step of passing a compressed wet fluid feed through either one or a plurality of permeable perfluoro sulfonic acid polymeric membranous hollow tubes, said hollow tubes being longer in length than in cross-section and being permeable to water-vapor; countercurrently passing a second relatively dry fluid stream past said feed stream and separated therefrom by said permeable volumetric walls of said tubes; controlling the flow rate of the second fluid stream so that the actual volumetric flow is at least substantially equal to that of the actual volumetric flow of said wet fluid feed whereby any water vapor from the feed is swept away so as to establish a water vapor pressure gradient and a water vapor concentration across and along the entire length of said walls of said tubes; recovering as retentate substantially dry fluid containing substantially less water vapor than present in wet fluid feed.

17. A process according to claim 16 further including the steps of recovering spent reflux and removing highly concentrated permeated components therefrom.

18. A process in accordance with claim 16 further including the steps of feeding spent reflux to a stripping stage whereby the permeates are yielded in richer concentration in the more permeable component or feeding the retentate to another permeation stage to yield a product poorer in the more permeable component.

19. A process according to claim 16 wherein the multiple component fluid feed mixture is gaseous.

20. A process according to claim 16 wherein the fluid is air.

21. A process according to claim 16 using self purge wherein the process is carried out in a manner such that $P/F$ in the following equation is equal to or greater than 1; that is, $$P/F = R/(R+D) \cdot PHi/PLo \geqq 1$$

wherein $R$ designates reflux flow rate measure in standard volumetric units per unit of time, $D$ designates the part of the total product flow rate removed from the system for external use, measured in the same standard units as $R$, $PHi$ designates the full pressure in the high pressure phase at the product end of the system and is measured in absolute pressure units, $PLo$ designates the pressure in the low pressure phase at the end of the system into which the reflux flows and is measured in the same absolute pressure units as $PHi$, and $P/F$ designates the ratio of reflux or purge actual volumetric flow to feed actual volumetric flow and is greater than 1.

* * * * *